United States Patent Office 3,258,471
Patented June 28, 1966

3,258,471
PROCESS FOR THE PREPARATION OF $\Delta^{1,3,5(10)}$- AND $\Delta^{1,3,5(10),9(11)}$-STEROIDS
Francisco Alvarez, Mexico City, Mexico, assignor to Syntex Corporation, Panama, Panama, a corporation of Panama
No Drawing. Filed June 15, 1964, Ser. No. 375,361
15 Claims. (Cl. 260—397.4)

This invention relates to a novel process for the preparation of cyclopentanopolyhydrophenanthrene derivatives.

More particularly, this invention relates to a novel process for the preparation of $\Delta^{1,3,5(10)}$- and $\Delta^{1,3,5(10),9(11)}$-steroids, e.g., $\Delta^{1,3,5(10)}$-estratrienes, $\Delta^{1,3,5(10),9(11)}$-estratetraenes, $\Delta^{1,3,5(10)}$-pregnatrienes and $\Delta^{1,3,5(10),9(11)}$-pregnatetraenes, in good yield and with a minimum of by-product formation, which comprises reacting a 10-carboxy-$\Delta^4$-3-keto steroid with about two molar equivalents or more of chlorine, bromine or iodine, preferably the latter, in the presence of a tertiary amine such as pyridine, to remove the 10-carboxyl group from said 10-carboxy-$\Delta^4$-3-keto steroid and, at the same time, aromatize the A-ring thereof and, in part, also introduce unsaturation at the 9(11)-position, thereby producing a mixture of the corresponding $\Delta^{1,3,5(10)}$-3-hydroxy and $\Delta^{1,3,5(10),9(11)}$-3-hydroxy steroids.

The valuable aromatic A ring steroids comprising this mixture can be individually isolated therefrom by conventional methods, e.g., by chromatography or fractional crystallization, of, if desired, the mixture can be hydrogenated to reduce the 9(11)-double bond in said $\Delta^{1,3,5(10),9(11)}$-3-hydroxy steroid, thereby giving an increased yield of the corresponding $\Delta^{1,3,5(10)}$-3-hydroxy steroid. Thus, for example, where 10β-carboxy-$\Delta^4$-estrene-3,17-dione is the steroid starting material, a mixture of estrone ($\Delta^{1,3,5(10)}$-estratrien-3-ol-17-one) and 9(11) - dehydroestrone($\Delta^{1,3,5(10),9(11)}$ - estratetraen - 3-ol-17-one) is obtained, and hydrogenation of this mixture increases the yield of estrone.

This novel process can be carried out using any 10-carboxy-$\Delta^4$-3-keto steroid, e.g., any of those represented by Formula I in the following reaction sequence:

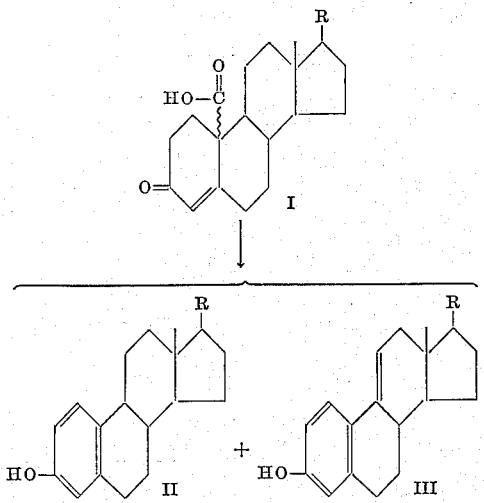

In these formulas R represents a keto group; the grouping:

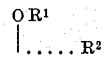

wherein $R^1$ represents hydrogen or an acyl group containing less than 12 carbon atoms and $R^2$ represents hydrogen, a lower alkyl group, such as methyl, ethyl, propyl, butyl, hexyl, and the like, a lower alkenyl group, such as vinyl, allyl, and the like, or lower alkynyl (including halo-lower alkynyl) group, such as ethynyl, fluorethynyl, chloroethynyl, bromoethynyl, propynyl, hexynyl, and the like; or the grouping:

wherein $R^3$ and $R^4$ each represent hydrogen, a hydroxyl group or an acyloxy group containing less than 12 carbon atoms, and $R^3$ and $R^4$, taken together with the 20-keto group, can represent a 17,20;20,21-bismethylenedioxy grouping, and the symbol ξ indicates that the carboxyl group attached to the 10-position of the steroid nucleus in the starting material can be in either the α- or β-configuration.

In addition to the foregoing 17-substituents, the 10-carboxy-$\Delta^4$-3-keto steroids which can be employed as starting materials in the process of the present invention can also contain other non-interfering substituents, e.g., keto groups or derivatives thereof, such as enolized or ketalized keto groups; hydroxyl groups or derivatives thereof, such as esterified or etherified hydroxyl groups and, in the case of a pair of hydroxyl groups, e.g., a 16α-hydroxy group and a 17α-hydroxy group, acetal or ketal derivatives; alkyl groups, e.g., methyl groups; halogen atoms, e.g., fluorine, chlorine or bromine, and the like, at one or more of positions 1, 2, 4, 5, 6, 7, 8, 9, 11, 12, 14, 15 and 16, and can belong to the estrane, pregnane, spirostane, chloane, cholestane, stigmastane or cardanolide series.

The acyloxy and acyl groups referred to herein are preferably derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

In carrying out the novel process of the present invention, the starting 10-carboxy-$\Delta^4$-3-keto steroid is dissolved in an aromatic, heterocyclic tertiary amine, preferably one which contains only carbon, nitrogen and hydrogen and is normally a liquid at room temperature, such as pyridine, α-collidine, β-collidine, γ-collidine, 2,4-lutidine, 2,6-lutidine, 3,4-lutidine, quinoline, isoquinoline, α-picoline, β-picoline, γ-picoline, or the like, containing at least about two molar equivalents of chlorine, bromine or iodine.

The aromatic amine will be employed in an amount sufficient to insure the complete dissolution of the steroid starting material, e.g., an amount ranging from about 3 cc. to about 100 cc., and preferably from about 10 cc. to about 15 cc. per gram of steroid starting material. Similarly, the chlorine, bromine or iodine will preferably be present in amounts ranging from about 2 molar equivalents to about 2.2 molar equivalents per molar equivalent of steroid starting material, although larger amounts of the halogen can be used without detriment to the reaction. Inert organic co-solvents or diluents, e.g., benzene, toluene, chlorobenzene, carbon tetrachloride, and the like, can also be present in varying amounts, if desired.

The reaction is carried out by heating the thus-prepared reaction mixture to a temperature of at least about 50° C., e.g., from about 50° C. to about 180° C., and preferably at from about 100° C. to about 115° C., for from about 4 to about 24 hours or longer, at atmospheric pressure, although higher temperatures coupled with shorter reaction times, and pressures above or below atmospheric, can also be employed, if desired. Thus, the particular reaction conditions other than the minimum temperature given above are not critical, but merely represent the best mode of carrying out the novel process of the present invention known at the present time. Similarly, the order of addition of the reactants is not critical, and can be varied from that given above. Finally, besides molecular chlorine, bromine or iodine, or mixtures or mixed reagents containing them, other sources of halogen, e.g., N-chloroacetamide, N-chlorosuccinimide, N-bromoacetamide, N-bromosuccinimide, N-iodosuccinimide, and the like, can also be employed in amounts sufficient to provide the necessary amount of halogen.

Included among the 10-carboxy-$\Delta^4$-3-keto steroids which can be employed as starting materials in practicing the novel process of the present invention are:

10β-carboxy-$\Delta^4$-estrene-3,17-dione,
10α-carboxy-$\Delta^4$-estren-17β-ol-3-one,
10β-carboxy-$\Delta^4$-estren-17β-ol-3-one,
10β-carboxy-$\Delta^4$-estren-17β-ol-3-one 17-acetate,
17α-methyl-10α-carboxy-$\Delta^4$-estren-17β-ol-3-one,
17α-methyl-10β-carboxy-$\Delta^4$-estren-17β-ol-3-one,
17α-ethyl-10β-carboxy-$\Delta^4$-estren-17β-ol-3-one,
17α-butyl-10β-carboxy-$\Delta^4$-estren-17β-ol-3-one,
17α-vinyl-10β-carboxy-$\Delta^4$-estren-17β-ol-3-one,
17α-ethynyl-10β-carboxy-$\Delta^4$-estren-17β-ol-3-one,
17α-fluoroethynyl-10β-carboxy-$\Delta^4$-estren-17β-ol-3-one,
17α-chloroethynyl-10β-carboxy-$\Delta^4$-estren-17β-ol-3-one,
17α-bromoethynyl-10β-carboxy-$\Delta^4$-estren-17β-ol-3-one,
17α-hexynyl-10β-carboxy-$\Delta^4$-estren-17β-ol-3-one,
$\Delta^4$-10α-pregnene-3,20-dione-19-oic acid,
$\Delta^4$-pregnene-3,20-dione-19-oic acid,
$\Delta^4$-10α-pregnen-17α-ol-3,20-dione-19-oic acid,
$\Delta^4$-pregnen-17α-ol-3,20-dione-19-oic acid,
$\Delta^4$-pregnen-17α-ol-3,20-dione-19-oic acid 17-acetate,
16α-methyl-$\Delta^4$-10α-pregnene-3,20-dione-19-oic acid,
16β-methyl-$\Delta^4$-10α-pregnene-3,20-dione-19-oic acid,
16α-methyl-$\Delta^4$-10α-pregnen-17α-ol-3,20-dione-19-oic acid,
16α,17α-isopropylidenedioxy-$\Delta^4$-10α-pregnene-3,20-dione-19-oic acid,
$\Delta^4$-pregnen-21-ol-3,20-dione-19-oic acid,
$\Delta^4$-pregnen-21-ol-3,20-dione-19-oic acid 21-acetate,
$\Delta^4$-pregnene-17α,21-diol-3,20-dione-19-oic acid,
$\Delta^4$-pregnene-17α,21-diol-3,20-dione-19-oic acid 21-acetate,
17,20;20,21-bismethylenedioxy-$\Delta^4$-10α-pregnen-3-one-19-oic acid, and the like.

These starting materials are readily prepared from the corresponding 19-hydroxy-$\Delta^4$-3-keto steroids by the methods set forth in copending U.S. patent application Serial No. 250,480, filed January 10, 1963, now U.S. Patent No. 3,210,385, in the case of the 10α-carboxy compounds, and in U.S. Patent No. 3,077,482 to Wettstein et al., in the case of the 10β-carboxy compounds.

As previously indicated, the mixture of the $\Delta^{1,3,5(10)}$-3-hydroxyestratriene and $\Delta^{1,3,5(10),9(11)}$-3-hydroxyestratetraene obtained from the above-described reaction can be hydrogenated to reduce the 9(11)-double bond in said tetraene and thus provide an increased yield of said triene. This can be accomplished, for example, using the mixture of triene and tetraene dissolved in the primary amine, e.g., pyridine, directly from the previous reaction, or using this mixed steroid reaction product dissolved in another inert organic solvent, e.g., a lower alkanol such as methanol or ethanol, and ester such as ethyl acetate, an ether such as dioxane, or the like, by suspending in the solution a hydrogenation catalyst such as prehydrogenated palladium-on-charcoal or platinum and then passing hydrogen through this suspension, preferably at atmospheric pressure and room temperature (about 25° C.), until about 1 molar equivalent of hydrogen has been absorbed.

In order that those skilled in the art can more fully understand the present invention, the following examples are set forth. These examples are given solely for the purpose of illustrating the invention, and should not be considered as expressing limitations unless so set forth in the appended claims.

*Example I*

Twenty-five grams of 10β-carboxy-$\Delta^4$-estrene-3,17-dione were dissolved in 375 ml. of pyridine containing 50 grams of iodine, and this reaction mixture was then heated to reflux temperature and maintained at reflux for 5 hours. It was noted that when the temperature of the reaction mixture reached 60° C., the evolution of carbon dioxide became apparent, and continued for about 15 minutes. Following the reaction period the reaction mixture was poured slowly into 1 liter of water, and the resulting mixture was then made slightly acidic by the careful addition of aqueous 30% hydrochloric acid thereto. Next, the acidified mixture was extracted with methylene chloride, and the resulting extracts were combined, washed twice with an aqueous 5% sodium thiosulfate solution and then with water, dried over anhydrous sodium sulfate and evaporated to dryness under reduced pressure, thus giving a mixture of estrone and 9(11)-dehydroestrone.

*Example II*

A suspension of 5 grams of 5% palladium-on-charcoal hydrogenation catalyst in 500 cc. of methanol was hydrogenated for 30 minutes at room temperature (about 25° C.) and atmospheric pressure. Next, a solution of the mixture of estrone and 9(11)-dehydroestrone prepared in Example I hereinabove in 2 liters of methanol was added to the catalyst suspension and stirred under a hydrogen atmosphere at room temperature and atmospheric pressure until approximately 1 molar equivalent of hydrogen was absorbed. Following this reaction period the reaction mixture was filtered to remove the catalyst and then evaporated to dryness under reduced pressure. Crystallization of the crude residue from methylene chloride/hexane, followed by chromatography on acid-washed alumina, gave 17.5 grams of estrone, M.P. 252–253° C., which represents a 70% overall yield of this product.

*Example III*

A mixture of estrone and 9(11)-dehydroestrone, prepared from 10β-carboxy-$\Delta^4$-estrene-3,17-dione in the manner described hereinabove in Example I, was dissolved in methanol, decolorized with activated charcoal and then filtered. Next, the filtrate was concentrated by heating it under reduced pressure until crystallization began. At this point, the concentrated solution was allowed to stand at room temperature until crystallization was complete. The crystalline precipitate, when collected by filtration, gave a 60% yield of 9(11)-dehydroestrone, $\lambda^{EtOH}_{max.}$ 264 m$\mu$, log $\epsilon$ 4.22.

*Example IV*

Ten grams of $\Delta^4$-pregnen-17α-ol-3,20-dione-19-oic acid were dissolved in 100 ml. of pyridine containing 15.6 grams of iodine, and this reaction mixture was then heated to reflux temperature and maintained at reflux for 6 hours. Following this reaction period the reaction mixture was worked up as described in Example I hereinabove to give a mixture of $\Delta^{1,3,5,(10)}$-pregnatriene-3,17α-diol-20-one and $\Delta^{1,3,5(10),9(11)}$-pregnatetraene-3,17α-diol-20-one.

Hydrogenation of the thus-obtained mixture in the manner described in Example II hereinabove gave, after crystallization from ethanol, a higher yield of $\Delta^{1,3,5(10)}$-pregnatriene-3,17α-diol-20-one.

Example V

A mixture of $\Delta^{1,3,5(10)}$-pregnatriene-3,17α-diol-20-one and $\Delta^{1,3,5(10),9(11)}$-pregnatetraene-3,17α-diol-20-one, prepared from $\Delta^4$-pregnen-17α-ol-3,20-dione-19-oic acid in the manner described hereinabove in Example IV, was dissolved in methanol and treated according to the procedure of Example III hereinabove to give a 50% yield of $\Delta^{1,3,5(10),9(11)}$-pregnatetraene-3,17α-diol-20-one, $\lambda_{max.}^{EtOH}$ 264 mμ, log ε 4.21

Examples VI–XII

The procedure of Example IV was repeated in each of these examples in every detail, except for the following. First of all, $\Delta^4$-pregnen-17α-ol-3,20-dione-19-oic acid was replaced by 10α-carboxy-$\Delta^4$-estrene-17β-ol-3-one, 17α-methyl-10β-carboxy-$\Delta^4$-estren-17β-ol-3-one, 17α-ethynyl-10β-carboxy-$\Delta^4$-estren-17β-ol-3-one, $\Delta^4$-pregnene-3,20-dione-19-oic acid, 16α-methyl-$\Delta^4$-10α-pregnene-3,20-dione-19-oic acid, 16α-methyl-$\Delta^4$-10α-pregnen-17α-ol-3,20-dione-19-oic acid and 17,20;20,21-bismethylenedioxy-$\Delta^4$-10α-pregnen-3-one-19-oic acid, respectively. Secondly, in Examples VIII and X, iodine was replaced by an equivalent amount (2.2 molar equivalents) of chlorine (from N-chloroacetamide) and bromine (from N-bromosuccinimide), respectively, while the pyridine was replaced by β-collidine and 2,4-lutidine, respectively. In every case, a mixture of the corresponding $\Delta^{1,3,5(10)}$- and $\Delta^{1,3,5(10),9(11)}$-steroids, namely, estradiol and 9(11)-dehydroestradiol, 17α-methylestradiol and 17α-methyl-9(11)-dehydroestradiol, 17α-ethynylestradiol and 17α-ethynyl-9(11)-dehydroestradiol, $\Delta^{1,3,5(10)}$-pregnatrien-3-ol-20-one and $\Delta^{1,3,5(10),9(11)}$-pregnatetraen-3-ol-20-one, 16α-methyl-$\Delta^{1,3,5(10)}$-pregnatrien-3-ol-20-one and 16α-methyl-$\Delta^{1,3,5(10),9(11)}$-pregnatetraen-3-ol-20-one, 16α-methyl-$\Delta^{1,3,5(10)}$-pregnatriene-3,17α-diol-20-one and 16α-methyl-$\Delta^{1,3,5(10),9(11)}$-pregnatetraene-3,17α-diol-20-one, and 17,20;20,21-bismethylenedioxy-$\Delta^{1,3,5(10)}$-pregnatrien-3-ol-20-one and 17,20;20,21-bismethylenedioxy-$\Delta^{1,3,5(10),9(11)}$-pregnatetraen-3-ol-20-one, respectively, were obtained.

It will be obvious to those skilled in the art that other changes and variations can be made in carrying out the present invention without departing from the spirit and scope thereof as defined in the appended claims.

I claim:

1. A process for the preparation of a mixture of $\Delta^{1,3,5(10)}$-3-hydroxy steroid and a $\Delta^{1,3,5(10),9(11)}$-3-hydroxy steroid which comprises reacting, at a temperature of at least about 50° C., the corresponding 10-carboxy-$\Delta^4$-3-keto steroid, dissolved in an aromatic, heterocyclic tertiary amine, with at least about two molar equivalents, per molar equivalent of said 10-carboxy steroid, of a halogen selected from the group consisting of chlorine, bromine and iodine.

2. A process for the preparation of a mixture of $\Delta^{1,3,5(10)}$-3-hydroxy steroid and a $\Delta^{1,3,5(10),9(11)}$-3-hydroxy steroid which comprises reacting, at a temperature of at least about 50° C., the corresponding 10-carboxy-$\Delta^4$-3-keto steroid, dissolved in pyridine, with at least about two molar equivalents, per molar equivalent of said 10-carboxy steroid, of a halogen selected from the group consisting of chlorine, bromine and iodine.

3. A process for the preparation of a mixture of $\Delta^{1,3,5(10)}$-3-hydroxy steroid and a $\Delta^{1,3,5(10),9(11)}$-3-hydroxy steroid which comprises reacting, at a temperature of at least about 50° C., the corresponding 10-carboxy-$\Delta^4$-3-keto steroid, dissolved in pyridine, with at least about two molar equivalents, per molar equivalent of said 10-carboxy steroid, of chlorine.

4. A process for the preparation of a mixture of a $\Delta^{1,3,5(10)}$-3-hydroxy steroid and a $\Delta^{1,3,5,(10),9(11)}$-3-hydroxy steroid which comprises reacting, at a temperature of at least about 50° C., the corresponding 10-carboxy-$\Delta^4$-3-keto steroid, dissolved in pyridine, with at least about two molar equivalents, per molar equivalent of said 10-carboxy steroid, of bromine.

5. A process for the preparation of a mixture of a $\Delta^{1,3,5(10)}$-3-hydroxy steroid and a $\Delta^{1,3,5(10),9(11)}$-3-hydroxy steroid which comprises reacting, at a temperature of at least about 50° C., the corresponding 10-carboxy-$\Delta^4$-3-keto steroid, dissolved in pyridine, with at least about two molar equivalents, per molar equivalent of said 10-carboxy steriod, of iodine.

6. A process for the preparation of a mixture of a $\Delta^{1,3,5(10)}$-3-hydroxyestratriene and a $\Delta^{1,3,5(10),9(11)}$-3-hydroxyestratetraene which comprises reacting, at a temperture of at least about 50° C., the corresponding 10-carboxy-$\Delta^4$-3-ketoestrene, dissolved in pyridine, with at least about two molar equivalents, per molar equivalent of said 10-carboxy steroid, of a halogen selected from the group consisting of chlorine, bromine and iodine.

7. A process of the preparation of a mixture of a $\Delta^{1,3,5(10)}$-3-hydroxypregnatriene and a $\Delta^{1,3,5(10),9(11)}$-3-hydroxypregnatetraene which comprises reacting, at a temperature of at least about 50° C., the corresponding 10-carboxy-$\Delta^4$-3-ketopregnene, dissolved in pyridine, with at least about two molar equivalents, per molar equivalent of said 10-carboxy steroid, of a halogen selected from the group consisting of chlorine, bromine and iodine.

8. A process for the preparation of a mixture of a $\Delta^{1,3,5(10)}$-3-hydroxyestratriene and a $\Delta^{1,3,5(10),9(11)}$-3-hydroxyestratetraene which comprises reacting, at a temperture of at least about 50° C., the corresponding 10-carboxy-$\Delta^4$-3-ketoestrene, dissolved in pyridine, with at least about two molar equivalents, per molar equivalent of said 10-carboxy steroid, of iodine.

9. A process for the preparation of mixture of a $\Delta^{1,3,5(10)}$-3-hydroxypregnatriene and a $\Delta^{1,3,5(10),9(11)}$-3-hydroxypregnatetraene which comprises reacting, at a temperature of at least about 50° C., the corresponding 10-carboxy-$\Delta^4$-3-ketopregnene, dissolved in pyridine, with at least about two molar equivalents, per molar equivalent of said 10-carboxy steroid, of iodine.

10. A process for the preparation of a mixture of estrone and 9(11)-dehydroestrone which comprises reacting, at a temperature of at least about 50° C., 10-carboxy-$\Delta^4$-estrene-3,17-dione, dissolved in pyridine, with at least about two molar equivalents, per molar equivalent of said 10-carboxy steroid, of iodine.

11. A process for the preparation of a mixture of estradiol and 9(11)-dehydoestradiol which comprises reacting, at a temperature of at least about 50° C. 10-carboxy-$\Delta^4$-estren-17β-ol-3-one, dissolved in pyridine, with at least about two molar equivalents, per molar equivalent of said 10-carboxy steroid, of iodine.

12. A process for the preparation of a mixture of $\Delta^{1,3,5(10)}$-pregnatrien-3-ol-20-one and $\Delta^{1,3,5(10),9(11)}$-pregnatetraen-3-ol-20-one which comprises reacting, at a temperature of at least about 50° C., $\Delta^4$-pregnene-3,20-dione-10-oic acid, dissolved in pyridine, with at least about two molar equivalents, per molar equivalent of said 19-oic acid, of iodine.

13. A process for the preparation of a mixture of $\Delta^{1,3,5(10)}$-pregnatrien-3-ol-20-one and $\Delta^{1,3,5(10),9(11)}$-pregnatetraen-3-ol-20-one which comprises reacting, at a temperature of at least about 50° C., $\Delta^4$-10α-pregnene-3,20-dione-19-oic acid, dissolved in pyridine, with at least about two molar equivalents, per molar equivalent of said 19-oic acid, of iodine.

14. A process for the preparation of a mixture of $\Delta^{1,3,5(10)}$-pregnatriene-3,17α-diol-20-one and $\Delta^{1,3,5(10),9(11)}$-pregnatetraene-3,17α-diol-20-one which comprises reacting, at a temperature of at least about 50° C., $\Delta^4$-pregnen- 17α-ol-3,20-dione-19-oic acid, dissolved in pyridine, with at least about two molar equivalents, per molar equivalent of said 19-oic acid, of iodine.

15. A process for the preparation of a mixture of $\Delta^{1,3,5(10)}$-pregnatriene-3,17α-diol-20-one and $\Delta^{1,3,5(10),9(11)}$-pregnatetraene-3,17α-diol-20-one which comprises reacting, at a temperature of at least about 50° C., $\Delta^4$-10α-pregnen-17α-ol-3,20-dione-19-oic acid, dissolved in pyridine, with at least about two molar equivalents, per molar equivalent of said 19-oic acid, of iodine.

No references cited.

LEWIS GOTTS, *Primary Examiner.*